United States Patent
Traylor et al.

(10) Patent No.: US 11,630,668 B1
(45) Date of Patent: Apr. 18, 2023

(54) PROCESSOR WITH SMART CACHE IN PLACE OF REGISTER FILE FOR PROVIDING OPERANDS

(71) Applicant: NXP B.V., Eindhoven (NL)

(72) Inventors: Kevin Bruce Traylor, Leander, TX (US); Jayakrishnan Cheriyath Mundarath, Austin, TX (US); Michael Andrew Fischer, San Antonio, TX (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/529,804

(22) Filed: Nov. 18, 2021

(51) Int. Cl.
   *G06F 12/0875* (2016.01)
   *G06F 9/30* (2018.01)
   *G06F 7/575* (2006.01)
   *G06F 9/38* (2018.01)

(52) U.S. Cl.
   CPC .......... *G06F 9/30047* (2013.01); *G06F 7/575* (2013.01); *G06F 9/30036* (2013.01); *G06F 9/30043* (2013.01); *G06F 9/3857* (2013.01)

(58) Field of Classification Search
   None
   See application file for complete search history.

(56) References Cited

U.S. PATENT DOCUMENTS

| 5,958,044 A | 9/1999 | Brown et al. |
| 7,085,789 B1 * | 8/2006 | Tarditi ................ G06F 12/0253 707/999.206 |
| 2002/0124157 A1 | 9/2002 | Le et al. |
| 2004/0057380 A1 * | 3/2004 | Biran ................... G06F 13/4022 370/235 |
| 2004/0181653 A1 * | 9/2004 | McGrath ................. G06F 9/342 712/228 |
| 2005/0138297 A1 | 6/2005 | Sodani et al. |
| 2014/0040595 A1 * | 2/2014 | Tran ...................... G06F 9/3857 712/228 |
| 2015/0026435 A1 * | 1/2015 | Muff .................... G06F 9/30138 712/208 |

(Continued)

OTHER PUBLICATIONS

Stephens, Nigel et al. "The ARM Scalable Vector Extension." IEEE Micro. vol. 37, Issue 2, Mar.-Apr. 2017. pp. 1-8.

(Continued)

*Primary Examiner* — Hyun Nam

(57) ABSTRACT

A processor including a pointer storage that stores pointer descriptors each including addressing information, an arithmetic logic unit (ALU) configured to execute an instruction which includes operand indexes each identifying a corresponding pointer descriptor, multiple address generation units (AGUs), each configured to translate addressing information from a corresponding pointer descriptors into memory addresses for accessing corresponding operands stored in a memory, and a smart cache. The smart cache includes a cache storage, and uses the memory addresses from the AGUs to retrieve and store operands from the memory into the cache storage, and to provide the stored operands to the ALU when executing the instruction. The smart cache replaces a register file used by a conventional processor for retrieving and storing operand information. The pointer operands include post-update capability that reduces instruction fetches. Wasted memory cycles associated with cache speculation are avoided.

20 Claims, 3 Drawing Sheets

(56) References Cited

U.S. PATENT DOCUMENTS

| | | | | |
|---|---|---|---|---|
| 2016/0378479 | A1* | 12/2016 | Burger | G06F 9/3836 |
| | | | | 712/205 |
| 2022/0382546 | A1* | 12/2022 | Tran | G06F 9/30018 |
| 2022/0382703 | A1* | 12/2022 | Hayes | G06F 12/0875 |
| 2022/0382892 | A1* | 12/2022 | Wang | G06F 16/9574 |

OTHER PUBLICATIONS

Programmer's Reference Manual (Includes CPU32 Instructions). © Motorola, Inc. M68000PM/ AD Rev.1 1992. pp. 1-71.

* cited by examiner

PROCESSOR WITH SMART CACHE IN PLACE OF REGISTER FILE FOR PROVIDING OPERANDS

BACKGROUND

Field of the Invention

The present invention relates in general to processors, and more particularly to a processor having a smart cache that replaces a register file for providing operands.

Description of the Related Art

Processors may be used to process arrays of data placed in memory in linear order or in a regular pattern. This leads to a series of instructions that often include the same math operation with associated memory accesses that occur in linear order or at least that occur in a regular pattern. The processor may execute groups of instructions to perform the math and memory operations per cycle, in which one or more instructions are placed in a loop and sequentially loaded from memory for execution. This requires multiple instruction fetches even when fetching the same instruction multiple times.

A conventional processor, such as a central processing unit (CPU) or the like, typically uses a register file for handling operands. When a register file is used for handling operands, the instructions use register names or indexes to identify the registers in the register file that hold the operands provided to an arithmetic logic unit (ALU). The programming process typically includes register allocation activity, performed by the programmer if using assembly language, or by the compiler if using a higher level programming language. The program execution must include instructions to load the registers from memory, to execute the arithmetic or logical function, and to store the result thereof into another location such as a register or memory. When processing an array or regular pattern of data, this execution process must be repeated using the same or different registers to repeat the instruction.

Assembly code must be changed when the number of registers is changed, so that conventional configurations are not scalable. The amount of local operand storage is not scaled easily since it usually requires changing the software. If the size of the register file in a conventional CPU is changed, the instruction set architecture (ISA) has to change, the debugger and tools have to change, the compiler has to change and any existing software has to be recompiled to run efficiently if the number of registers has been increased, or to run at all of the number of registers has been decreased.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

A processor as described herein uses instructions in which most operands are pointers to memory, with automatic post-update capability for each operand pointer. The register file is replaced with a "smart" cache which has access to the parameters of the operand address generators and therefore does not speculate in the traditional sense of cache speculation and minimizes wasted memory accesses. Instead of requiring separate instructions to be fetched and executed for performing the math, memory access, and operand address update functions, a processor as described herein reduces the number of instruction fetches by defining the math operations to use pointer operands with post-update capability. Instruction operands are pointers that designate where the data is located in memory rather than being register names, as is done in prior art instruction sets. The smart cache has access to all the pointer addresses and associated parameter values, as well as the updates made thereto by the address generators, and can determine the most critical piece of data which should be fetched from memory per cycle. Speculation is not necessary and memory cycles are rarely, if ever, wasted because the smart cache has access to the sequence of future addresses that each pointer will access, rather than just the address of the current access.

The smart cache performs some of the same functions performed by a conventional register file, such as providing the operands to the ALU. The smart cache also includes barrel shifters that allow operands to have any arbitrary alignment in memory. Improvements include a reduced number of instruction fetches to perform a given algorithm, easier assembly programming since there is no register allocation, scalability because the cache size can be increased or decreased without having to change the assembly code, elimination of speculative fetches, and arbitrary vector alignment.

Figure 1:
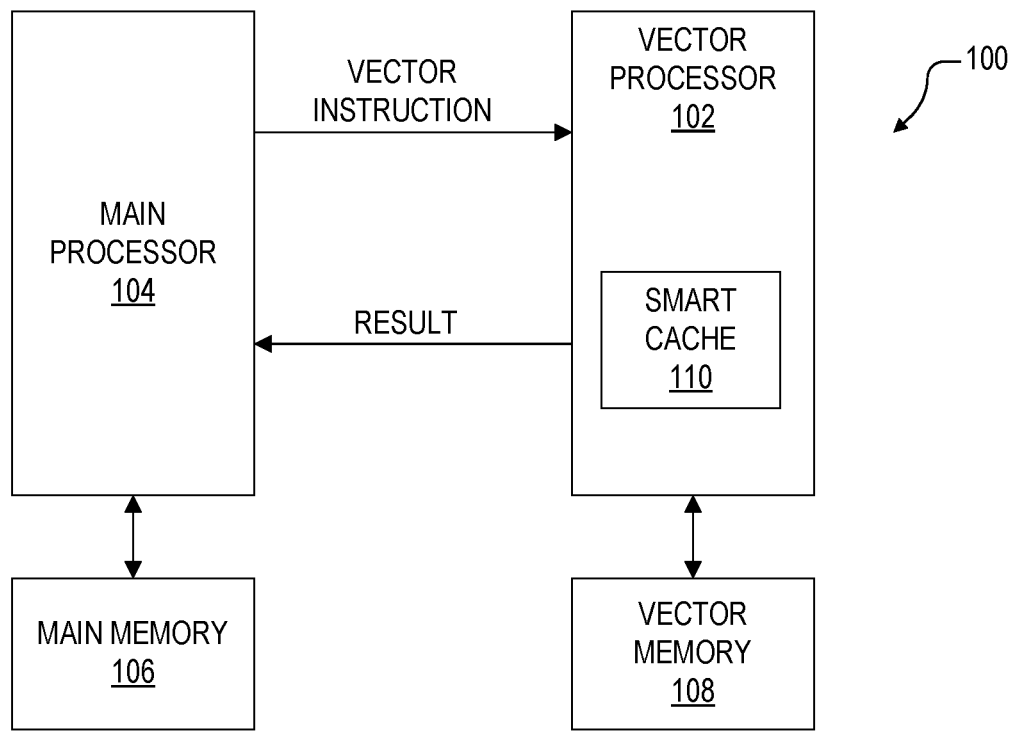
FIG. 1 is a simplified block diagram of a processing system including a vector processor implemented according to one embodiment of the present disclosure.

FIG. 1 is a simplified block diagram of a processing system 100 including a vector processor 102 implemented according to one embodiment of the present disclosure. Vector processors are often used to process arrays of data placed in memory in linear order or in a regular pattern. This leads to a series of instructions that often include the same math operation with associated memory accesses that occur in linear order or at least that occur in a regular pattern. In the illustrated configuration of the processing system 100, the vector processor 102 is used in conjunction with a primary or main processor 104. The main processor 104 may be a general purpose (GP) processor or CPU or the like for retrieving program instructions or data from a main memory 106. In one embodiment, for example, the main processor 104 may perform integer and floating point arithmetic operations, flow control, and other primary functions. The vector processor 102, on the other hand, may be provided to handle single instruction, multiple data (SIMD) arithmetic and logical processing commands on vector data, typically stored within a dedicated vector memory 108, but possibly stored in other data memory addressable by the main processor 104. The vector processor 102 includes a smart cache 110 that retrieves information from the vector memory 108 for performing vector instructions and the like from the main processor 104. The main memory 106 and the vector memory 108 collectively form a memory system, in which the main memory 106 and the vector memory 108 may be separately provided or incorporated within a common memory system.

The illustrated configuration including a main processor 104 in which the vector processor 102 is used as a coprocessor is exemplary only in which alternative configurations and use cases are possible and contemplated. Although the vector processor 102 is used to illustrate replacing a register file with a smart cache, it is understood that the present invention is not limited to vector processors and may be applied to any type of processor or processing system. A processor with a smart cache that replaces a register file as described herein may be a general processor or main processor or the like, or may be a standalone processor or processing system rather than a coprocessor in a multiprocessor configuration.

In operation of the illustrated processing system 100, when the main processor 104 encounters an instruction to be executed by the vector processor 100, referred to herein as a "vector instruction," it passes the vector instruction to the vector processor 102. The vector processor 102 translates operand information provided in the vector instruction to memory addresses of the vector memory 108 along with any other addressable memory, such as, for example, the main memory 106, and further interprets opcode and other information provided in the instruction for identifying the operation to be performed along with other execution parameters. The memory addresses are provided to the smart cache 110, which retrieves the data from the vector memory 108 and other addressable memory for execution by the vector processor 102. The vector processor 102 then executes the vector instruction with the retrieved information. It is noted that the primary functionality of the vector processor 102 involves fetching vector sources from the vector memory 108 and other addressable memory (in which such sources may be regularly addressed and not necessarily sequential), processing the elements thereof to produce one or more vector results, and storing those vector results into the vector memory 108 or other addressable memory. Although not shown, there may be cases in which the main processor 104 provides a scalar source or the like and cases in which the main processor 104 receives a scalar result. When the vector processor 102 has completed execution of the vector instruction, it may provide a result back to the main processor 104 or simply indicate that it has completed execution of the vector instruction.

Figure 2:
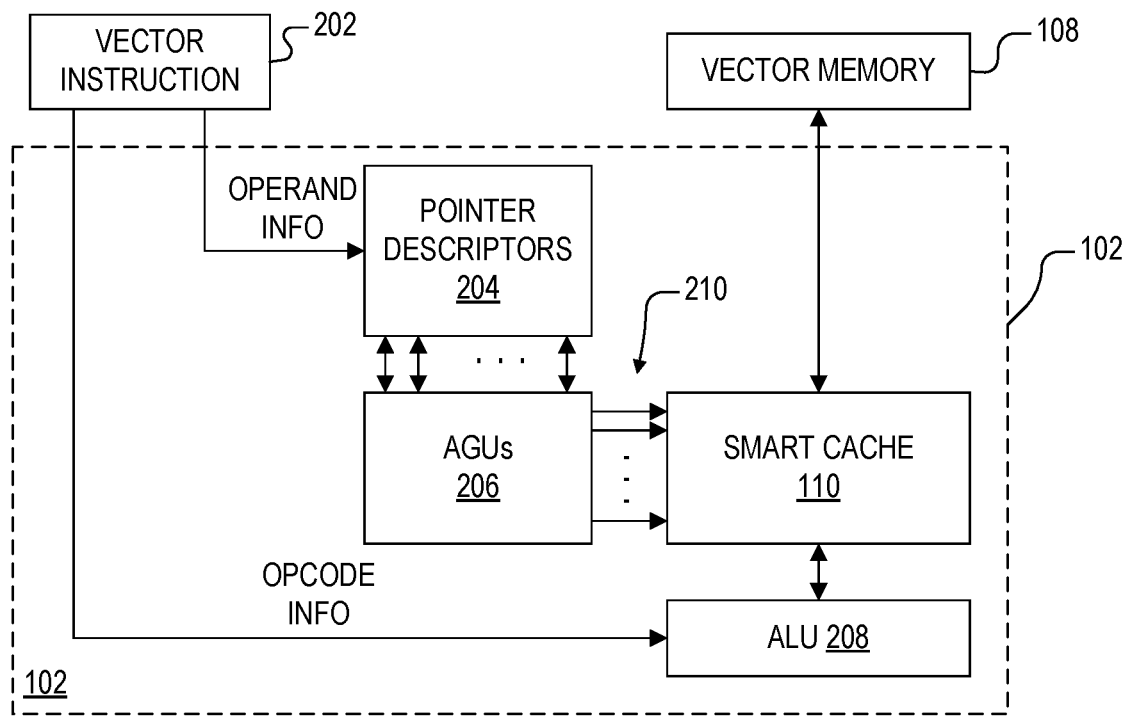
FIG. 2 is a simplified block diagram of the vector processor coupled to the vector memory of FIG. 1 for executing a vector instruction according to one embodiment of the present disclosure.

FIG. 2 is a simplified block diagram of the vector processor 102 coupled to the vector memory 108 for executing a vector instruction 202 according to one embodiment of the present disclosure. The vector instruction 202 provides opcode information (OPCODE INFO) and operand information (OPERAND INFO) to the vector processor 102. The OPCODE INFO identifies the arithmetic, logical, or other data processing operation operation to be performed and other information such as the amount of times the instruction is to be sequentially executed. The OPERAND INFO includes information associated with one or more source operands and at least one destination operand (e.g., DST). The vector processor 102 includes a set of pointer descriptors 204, a set of address generation units (AGUs) 206, the smart cache 110, and an arithmetic logic unit (ALU) 208. The pointer descriptors 204 may be implemented using any type of storage, such as registers or the like. Each of the pointer descriptors 204 stores addressing information that is used by a designated one of the AGUs 206 for generating addresses as further described herein. The term "addressing information" as used herein may include addresses, addressing mode, and other addressing generation parameters, such as, for example, a base address, an index, an update value, an addressing mode, along with other ancillary information that may be used for a given configuration. In addition, the AGUs 206 perform post-modification to write updated index values back into the pointer descriptors 204.

The OPERAND INFO is provided to the pointer descriptors 204, which provides addresses, addressing mode, and other address generation parameters to the AGUs 206. The AGUs 206 generate corresponding memory addresses 210 identifying locations of operands within the vector memory 108 and other addressable memory to the smart cache 110, and the smart cache 110 uses the memory addresses 210 to to retrieve corresponding operands, including fetching operands from vector memory 108 if the data is not already present in the smart cache 110. The OPCODE INFO from the vector instruction 202 and source operands from the smart cache 110 are provided to the ALU 208, which executes the operation defined within the vector instruction 202 one or more times as further described herein. The result(s) of each execution of a vector instruction 202 are provided to any combination of the vector memory 108, or to the smart cache 110, or to a forwarding path based on information in the OPCODE INFO.

At least one advantage of using the smart cache 110 rather than a register file is elimination of register allocation. Although one or more of the pointer descriptors 204 are set up before execution of vector instructions, including the vector instruction 202, once set up, they are reused for subsequent iterations and are changed far less often as regular registers used for operands. The OPCODE INFO identifies a number of times for sequential execution of the vector instruction 202, which substantially reduces the number of instruction fetches over time. In addition, the opcode information combined with information in the pointer descriptors 204 provide complete post-update information, so that each pointer address is automatically incremented, reset, or otherwise updated, as specified by various descriptor parameters, for each instance of vector instruction execution. Although a conventional cache is usually configured to perform speculation to anticipate the requisite data to be retrieved, cache speculation is eliminated since the smart cache 110 is provided with the actual sequence of memory addresses 210 needed to access the operands in vector memory 108, as well as information that permit the cache control logic to know when the next word of the operand needs to be fetched from vector memory 108. Also, the smart cache 110 enables scalability because the cache size can be increased or decreased without having to change the assembly code or application software.

Figure 3:
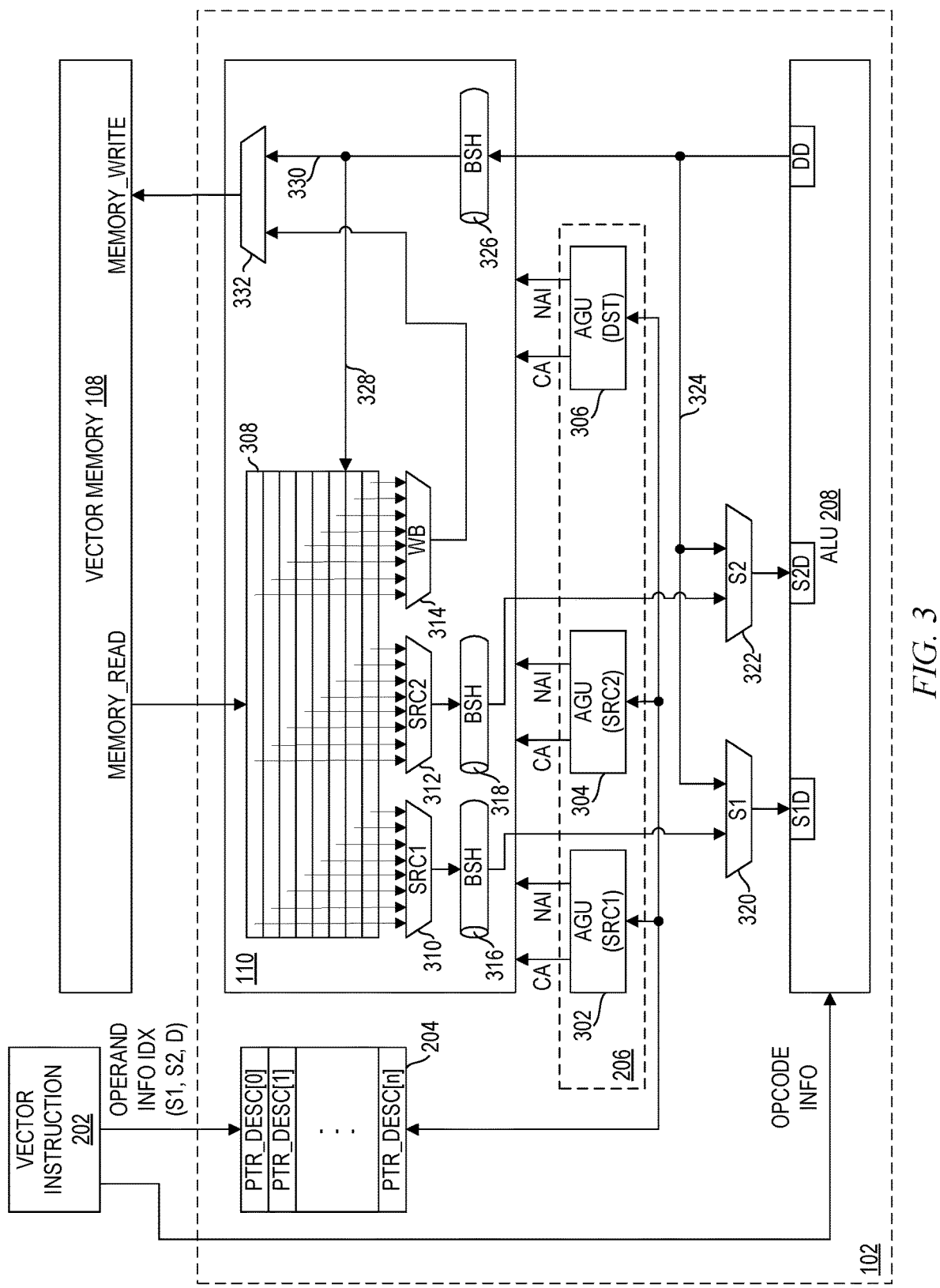
FIG. 3 is a more detailed block diagram of the vector processor and the smart cache receiving the vector instruction of FIG. 1 according to one embodiment of the present disclosure.

FIG. 3 is a more detailed block diagram of the vector processor 102 and the smart cache 110 receiving the vector instruction 202 according to one embodiment of the present disclosure. In one embodiment, the OPERAND INFO from the vector instruction 202 includes an index (IDX) for each of multiple instruction operands, such as a first index S1 for a first source operand SRC1, a second index S2 for a second source operand SRC2, and a third index D for a destination operand DST. Although only two source operands and one destination operand are shown and described, it is understood that any number of source and destination operands may be defined in different embodiments. Each index may be used as a lookup address or the like for accessing a corresponding one of multiple pointer descriptors PTR_DESC[IDX] 204 used for the corresponding operand. In one embodiment, the pointer descriptors 204 includes a number n+1 of pointer descriptors PTR_DESC[0], PTR_DESC[1], . . . , PTR_DESC[n], in which IDX number "n" is any suitable integer number greater than or equal to the maximum number of operand index values that may be present in a single vector instruction and less than or equal to the number of vector words in a cache storage 308. In one embodiment, for example, n is 7 for a total of 8 pointer descriptors 204.

Each of the pointer descriptors 204 stores addressing information for accessing operands in the form of vectors in the vector memory 108 and any other addressable memory (e.g., main memory 106), such as base address, element size, data type, vector size, addressing mode, and post modification value(s), among other parameters. A vector may include one or more elements, such as an array of elements or the like. The base address is a starting address for locating the vector elements in the vector memory 108. The element size identifies the size of each element of each vector, such as a number of bits or bytes or the like. The data type indicates the data type of each element, such as characters, signed integers, unsigned integers, complex numbers, floating point values, Boolean values, etc. The vector size indicates the number of elements of the vector. The post modification value(s) indicate how an address is incremented or otherwise modified for each iteration of the instruction, since the instruction may be performed one or more sequential times. Any number of addressing modes may be defined, such as, for example, linear, modulo, bit reversed, strided, striped, masked, etc. Software or the like executed by the main processor 104, or by the vector processor 102, or by an external processing system (not shown) programs one or more of the pointer descriptors 204 with the addressing mode information before vector instructions are executed by the vector processor 102.

The AGUs 206 include a separate AGU for each operand, such as an AGU 302 for the first source operand SRC1, an AGU 304 for the second source operand SRC2, and an AGU 306 for the destination operand DST. Each of the AGUs 206 is controlled by the contents of a pointer descriptor, within the set of pointer descriptors 204, that is specified by the IDX value in the corresponding field of the vector instruction currently being executed. Each of the AGUs 206 use the specified pointer descriptor information to generate the vector memory addresses needed to access the operands. Thus, the AGU 302 is controlled by the contents of the pointer descriptor identified by the first index S1, the AGU 304 is controlled by the contents of the pointer descriptor identified by the second index S2, and the AGU 306 is controlled by the contents of the pointer descriptor identified by the third index D. In one embodiment, each of the AGUs 206 is assigned or even hard-coded to a corresponding one or more of the pointer descriptors 204. In an alternative embodiment, each of the AGUs 206 may be programmatically assigned to one or more of the pointer descriptors 204.

Each of the AGUs 302, 304 and 306 generates vector memory addresses including a current address (CA) and next address information (NAI) and provides the address information to the smart cache 110. The smart cache 110 uses the address information to retrieve data from the vector memory 108, in which the retrieved data provided from a MEMORY_READ output of the vector memory 108 is stored into the cache storage 308. The cache storage 308 stores any suitable number "m" of vector memory lines of the vector memory 108. The size of the cache storage 308 is selected based on the particular needs of a given implementation, and the size may be modified for future devices without having to modify the assembly language or application software. Although the cache storage 308 may be implemented with random access memory (RAM) devices or the like, the cache storage 308 may also be implemented as flip-flops or the like for speed.

The smart cache 110 includes a first multiplexer (MUX) 310 for selecting from among the cache lines in the cache storage 308 storing data for the first source operand SRC1, and includes a second MUX 312 for selecting from among the cache lines in the cache storage 308 storing data for the second source operand SRC2. A third MUX 314 is a write back (WB) MUX provided for selecting from among the cache lines in the cache storage 308 for eviction operations in which older information is replaced with newer and more relevant information, and for flushing operations for maintaining coherency between the cache storage 308 and the vector memory 108. The output of the MUX 310 is provided to an input of a barrel shifter (BSH) 316 and the output of the MUX 312 is provided to an input of another barrel shifter 318. The barrel shifters 316 and 318 are used to shift the data provided from the corresponding MUXes 310 and 312, respectively, for use by the ALU 208, which allows the smart cache 110 to provide the ALU 208 with vector operands which have arbitrary alignment relative to the position at which the vector elements are stored in vector memory 108. In this manner, vectors do not have to be aligned on vector memory word boundaries and there is no cycle penalty for accessing an unaligned vector which is already present in the cache storage 308. In one embodiment, the barrel shifter shift count used to align the operands for each barrel shifter can be determined directly from the least significant bits (LSBs) of the current address values provided by the AGUs 206 to the smart cache 110 and does not not require any information to be contained in the vector instruction.

The output of the barrel shifter 316 for SRC1 data is provided to one input of a first source (S1) MUX 320 and the output of the barrel shifter 318 for SRC2 data is provided to one input of a second source (S2) MUX 322. The output of the MUX 320 is provided to a first source data input S1D and the output of the MUX 322 is provided to a second source data input S2D of the ALU 208. Once the source operand is available to the ALU 208, it performs the operation indicated within vector instruction 202 and generates a result that is provided to a destination data (DD) output of the ALU 208.

The result at the DD output of the ALU 208 is provided to a second input of each of the MUXes 320 and 322 along a forwarding path 324. The DD output from the ALU 208 is also provided to an input of another barrel shifter 326 within the smart cache 110, which may be used to align the destination data for storage back to the cache storage 308 or the vector memory 108. The output of the barrel shifter 326 is provided to update corresponding data stored in the cache storage 308 via a writeback path 328, and is provided to one input of another MUX 332 via a cache bypass path 330. The output of the MUX 314 for eviction or flushing is coupled to the other input of the MUX 332, and the output of the MUX 332 is provided to a MEMORY_WRITE input of the vector memory 108. In this manner, destination data from the ALU 208 may be forwarded back as source input to the ALU 208 for the next instruction, may be written back to the cache storage 308, or may be stored back into the vector memory 108. Also, the MUXes 314 and 332 may be controlled by the smart cache 110 for writing data from the cache storage 308 back to the vector memory 108 for eviction and flushing operations.

Figure 4:
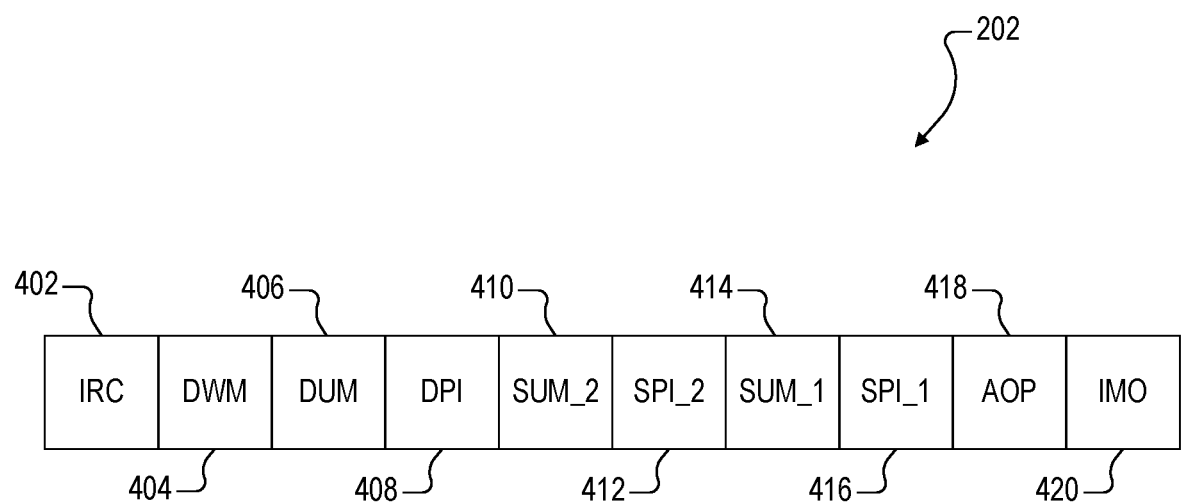
FIG. 4 is a diagram illustrating fields of the vector instruction of FIG. 2 according to one embodiment of the present disclosure.

FIG. 4 is a diagram illustrating fields of the vector instruction 202 according to one embodiment of the present disclosure. Although the fields are shown in a particular order, it is understood that the ordering of the fields is arbitrary and may be rearranged in any desired manner. A first field 402 stores an instruction repeat count (IRC) that identifies the number of consecutive times that the vector instruction 202 executed. The ALU 208 thus consecutively executes the instruction thereby reducing the number of instruction fetches as compared to conventional processors. Since all operands are pointers with post-modification capabilities, instruction repeating capability is useful for processing large arrays in the vector 108 memory with the same ALU operation.

A second field 404 stores a destination writeback mode (DWM) that controls which of the paths 324, 328, or 330 is used for routing the destination data. It is noted that the smart cache 110 may be tightly coupled to the instruction decoder of the ALU 208, which enables the cache writeback policy based on fields or values in the instruction opcode. In this manner, any combination of forwarding, cache writeback or memory writeback can be supported at the instruction level. In addition, the smart cache 110 may use its eviction/replacement/locking policies and knowledge of future accesses to keep the most relevant data in the cache storage 308. In an alternative embodiment, cache management (eviction or replacement) is managed by the smart cache 110 that may or may not use supplementary information from the instruction itself. In such embodiments, future enhancements of the smart cache 110 may be supported without modifying the instruction set.

A third field 406 stores a destination update mode (DUM) indicating whether to update the destination operand and if so, the mode of updating selected from among multiple different update modes. A fourth field 408 stores the destination pointer index (DPI) that selects one of the pointer descriptors 204 that is used by the designated AGU to generate (and possibly update) the destination address.

A fifth field 410 stores a source update mode for the second source operand SRC2 (SUM_2) indicating whether to update the SRC2 operand and if so, the mode of updating. A sixth field 412 stores the source pointer index (SPI_2) that selects one of the pointer descriptors 204 that is used by the designated AGU to generate (and possibly update) the source address for the SRC2 operand.

A seventh field 414 stores a source update mode for the first source operand SRC1 (SUM_1) indicating whether to update the SRC1 operand and if so, the mode of updating selected from among multiple different update modes. An eighth field 416 stores the source pointer index (SPI_1) that selects one of the pointer descriptors 204 that is used by the designated AGU to generate (and possibly update) the source address for the SRC1 operand.

A ninth field 418 stores an ALU operation (AOP) value identifying the arithmetic, logical, or other data processing operation to be performed by the ALU 208, such as addition, multiplication, etc. A tenth field 420 stores instruction major opcode information (IMO) used by the main processor 104 to determine that the instruction is a vector instruction 202.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A processor, comprising:
   a pointer storage that stores a plurality of pointer descriptors each comprising addressing information;
   an arithmetic logic unit configured to execute an instruction which includes a plurality of operand indexes, wherein each operand index identifies a corresponding one of the plurality of pointer descriptors;
   a plurality of address generation units, each configured to translate addressing information from a corresponding one of the plurality of pointer descriptors into a corresponding plurality of memory addresses for accessing corresponding operands stored in a memory; and
   a smart cache including cache storage, wherein the smart cache is configured to use the plurality of memory addresses from each of the plurality of address generation units to retrieve operands from the memory and to store retrieved operands into the cache storage, and that is configured to provide corresponding operands from the cache storage to the arithmetic logic unit when executing the instruction.

2. The processor of claim 1, wherein each of the plurality of address generation units is configured to be assigned to a corresponding one of the plurality of pointer descriptors, and wherein each of the plurality of operand indexes identifies a corresponding one of the plurality of pointer descriptors that is accessed by a corresponding one of the plurality of address generation units for generating memory addresses for a corresponding one of a plurality of source operands and at least one destination operand.

3. The processor of claim 1, wherein the addressing information comprises a base address and an addressing mode for locating a corresponding operand in the memory.

4. The processor of claim 1, wherein each operand comprises a plurality of elements, and wherein the addressing information comprises an element size and a data type of each of the plurality of elements.

5. The processor of claim 1, wherein the addressing information comprises at least one post modification value that is used by a corresponding one of the plurality of address generation units to determine addresses of a plurality of operand instances of a given operand type.

6. The processor of claim 1, wherein the smart cache comprises select circuitry that is configured to select and provide a plurality of source operands from the cache storage to the arithmetic logic unit.

7. The processor of claim 6, wherein the smart cache further comprises a plurality of barrel shifters, each for aligning a corresponding one of the plurality of source operands for use by the arithmetic logic unit.

8. The processor of claim 1, wherein the instruction includes at least one repeat count value that identifies a number of times that the instruction is to be executed by the arithmetic logic unit.

9. The processor of claim 1, wherein the arithmetic logic unit comprises a destination data output for providing destination data, wherein the instruction includes at least one destination writeback value that identifies a writeback policy for the destination data, and wherein the writeback value determines whether the destination data is provided to the smart cache, and if so, whether the destination data is stored into at least one of the cache storage and the memory.

10. The processor of claim 1, wherein the arithmetic logic unit comprises a destination data output for providing destination data, further comprising select circuitry that is controlled by the instruction to select between a source operand from the smart cache and the destination data for providing a subsequent source operand to a source operand input of the arithmetic logic unit.

11. The processor of claim 1, wherein the arithmetic logic unit comprises a destination data output, and wherein the smart cache further comprises a barrel shifter that aligns destination data provided from the destination data output of the arithmetic logic unit.

12. The processor of claim 1, wherein the arithmetic logic unit comprises a destination data output, and wherein the smart cache further comprises select circuitry that is configured to select between destination data from the destination data output of the arithmetic logic unit and data stored in the cache storage for providing selected data to the memory.

13. A processing system, comprising:
a memory system;
a main processor that is configured to retrieve instructions from the memory system for execution including a vector instruction to be executed by a vector processor; and
wherein the vector processor comprises:
a pointer storage that stores a plurality of pointer descriptors each comprising addressing information;
an arithmetic logic unit configured to execute the vector instruction which includes a plurality of operand indexes, wherein each operand index identifies a corresponding one of the plurality of pointer descriptors;
a plurality of address generation units, each configured to translate addressing information from a corresponding one of the plurality of pointer descriptors into a corresponding plurality of memory addresses for accessing corresponding operands stored in a vector memory; and
a smart cache including cache storage, wherein the smart cache is configured to use the plurality of memory addresses from each of the plurality of address generation units to retrieve operands from the memory system and to store retrieved operands into the cache storage, and that is configured to provide corresponding operands from the cache storage to the arithmetic logic unit when executing the vector instruction.

14. The processing system of claim 13, wherein each of the plurality of address generation units is configured to be assigned to a corresponding one of the plurality of pointer descriptors, and wherein each of the plurality of operand indexes identifies a corresponding one of the plurality of pointer descriptors that is accessed by a corresponding one of the plurality of address generation units for generating memory addresses for a corresponding one of a plurality of source operands and at least one destination operand.

15. The processing system of claim 13, wherein each operand comprises a plurality of elements, and wherein the addressing information comprises an element size and a data type of each of the plurality of elements.

16. The processing system of claim 13, wherein the addressing information comprises at least one post modification value that is used by a corresponding one of the plurality of address generation units to determine addresses of a plurality of operand instances of a given operand type.

17. The processing system of claim 13, wherein the smart cache comprises select circuitry that is configured to select and provide a plurality of source operands from the cache storage to the arithmetic logic unit.

18. The processing system of claim 17, wherein the smart cache further comprises a plurality of barrel shifters, each for aligning a corresponding one of the plurality of source operands for use by the arithmetic logic unit.

19. The processing system of claim 13, wherein the instruction includes at least one repeat count value that identifies a number of times that the instruction is to be executed by the arithmetic logic unit.

20. The processing system of claim 13, wherein the arithmetic logic unit comprises a destination data output for providing destination data, wherein the vector instruction includes at least one destination writeback value that identifies a writeback policy for the destination data, and wherein the writeback value determines whether the destination data is provided to the smart cache, and if so, whether the destination data is stored into at least one of the cache storage and the vector memory.

* * * * *